US010596703B1

(12) United States Patent
Linnell et al.

(10) Patent No.: US 10,596,703 B1
(45) Date of Patent: Mar. 24, 2020

(54) PARAMETRIC GENERATION OF INTERLOCKING JOINTS

(71) Applicant: X Development LLC, Mountain View, CA (US)

(72) Inventors: Jeff Linnell, Mountain View, CA (US); Marek Michalowski, Mountain View, CA (US); Kendra Byrne, Mountain View, CA (US); Jonathan Proto, Mountain View, CA (US); Brandon Kruysman, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 306 days.

(21) Appl. No.: 15/220,300

(22) Filed: Jul. 26, 2016

(51) Int. Cl.
  *B25J 9/16* (2006.01)
  *G05B 19/4099* (2006.01)
  *B25J 11/00* (2006.01)

(52) U.S. Cl.
  CPC ......... *B25J 9/1671* (2013.01); *B25J 11/0055* (2013.01); *G05B 19/4099* (2013.01); *G05B 2219/35134* (2013.01); *G05B 2219/45068* (2013.01); *Y10S 901/02* (2013.01); *Y10S 901/41* (2013.01)

(58) Field of Classification Search
  CPC . B25J 9/1671; B25J 11/0055; G05B 19/4099; G05B 2219/35134; G05B 2219/45068; Y10S 901/02; Y10S 901/41
  See application file for complete search history.

(56) References Cited

U.S. PATENT DOCUMENTS

| | | | |
|---|---|---|---|
| 5,380,978 A | 1/1995 | Pryor | |
| 2006/0048364 A1 | 3/2006 | Zhang et al. | |
| 2007/0142968 A1 | 6/2007 | Prisco et al. | |
| 2009/0162813 A1* | 6/2009 | Glor | A61C 1/084 433/196 |
| 2011/0130761 A1 | 6/2011 | Plaskos | |
| 2011/0196377 A1* | 8/2011 | Hodorek | A61B 17/155 606/87 |
| 2013/0182980 A1* | 7/2013 | Peterson | F16C 17/06 384/306 |
| 2013/0209961 A1* | 8/2013 | Rubbert | A61K 6/0044 433/175 |

\* cited by examiner

*Primary Examiner* — Kenneth M Lo
*Assistant Examiner* — Mohammad A Rahman
(74) *Attorney, Agent, or Firm* — Fish & Richardson P.C.

(57) ABSTRACT

The present application discloses implementations relate to automated generation of interlocking joint features. An example method involves obtaining a virtual model of an object. The virtual model specifies dimensions of a first element, dimensions of a second element, and a spatial relation between the first element and the second element that defines a joint angle. The example method also involves obtaining a relationship that correlates element dimensions and joint angles with cut dimensions. The example method further involves determining cut dimensions for the first element the second element based on the relationship, the dimensions of the first element, the dimensions of the second element, and the joint angle. Modifying the first element and the second element according to the cut dimensions produces interlockable features on the first element and the second element. Additionally, the method involves providing an output signal indicative of the cut dimensions.

20 Claims, 10 Drawing Sheets

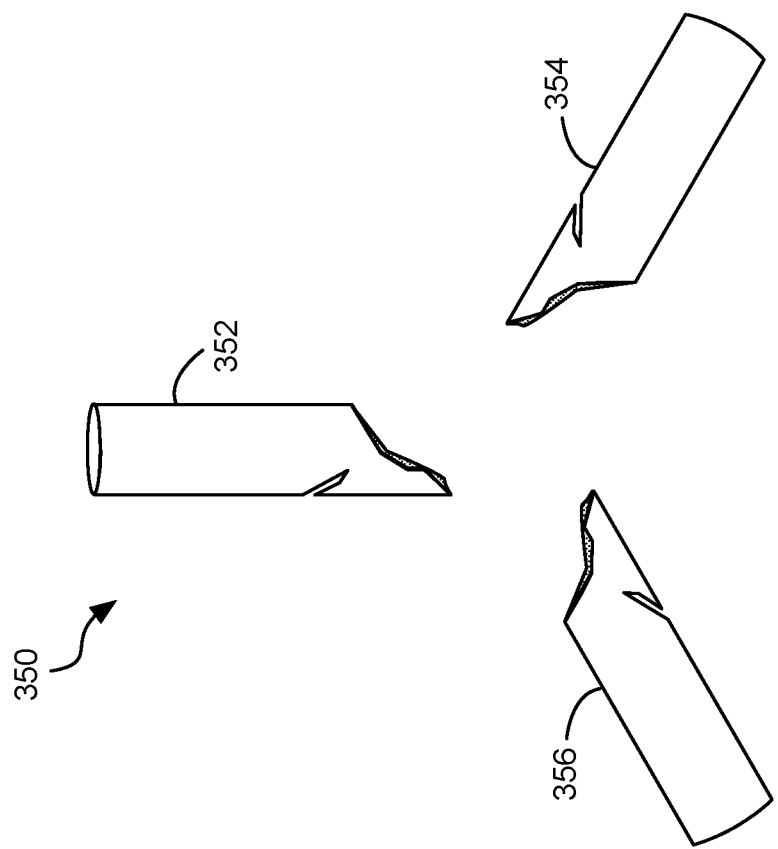
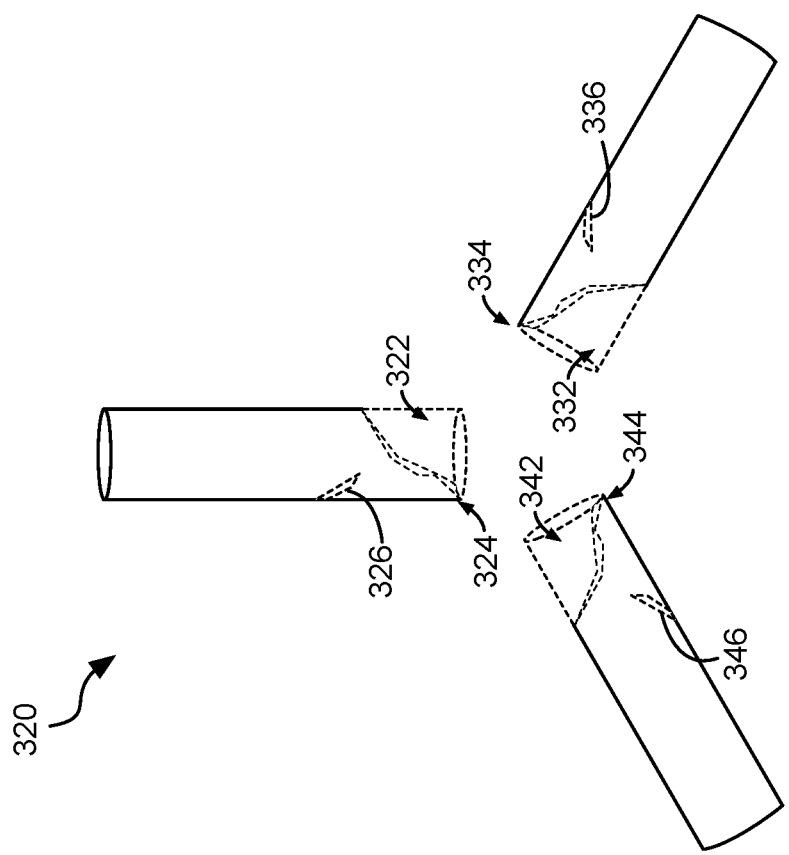
Figure 3C
Figure 3B

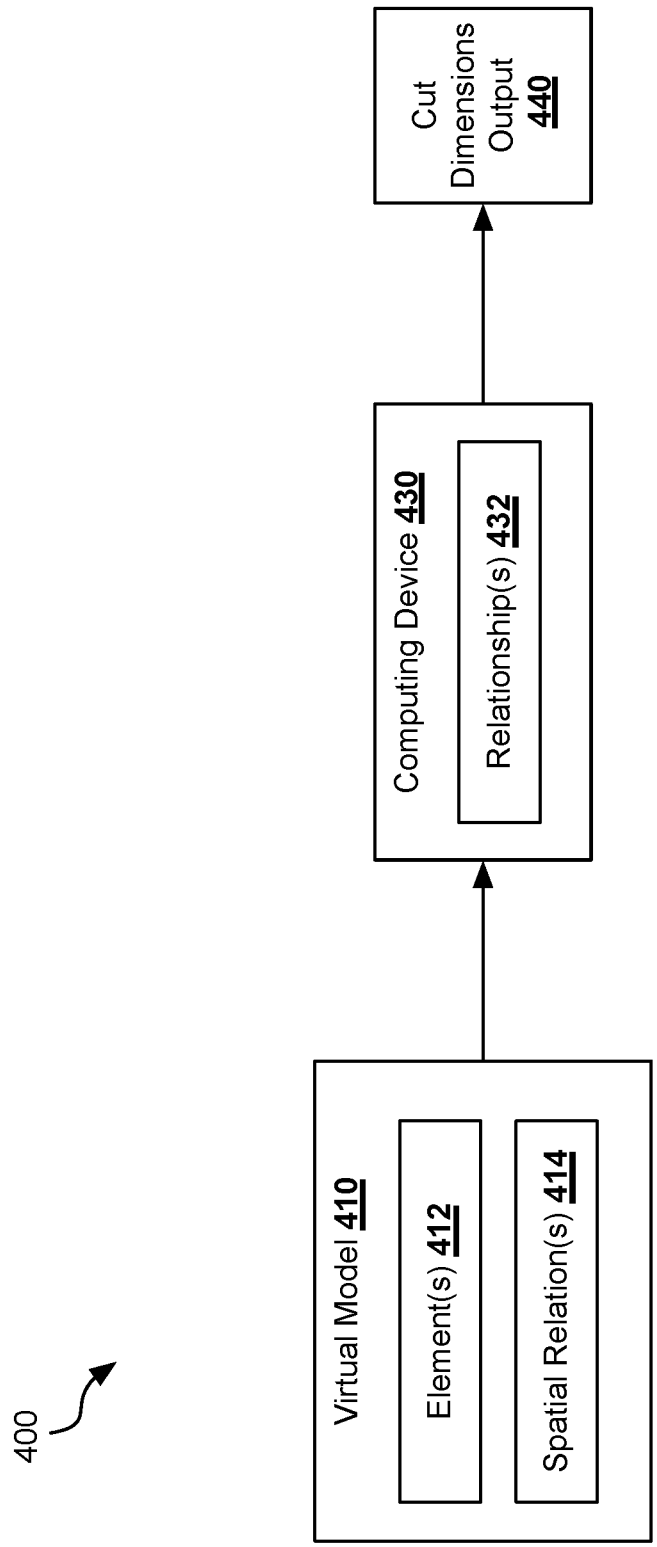

PARAMETRIC GENERATION OF INTERLOCKING JOINTS

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of working alongside humans becomes apparent. Therefore, a demand for such robotic systems has helped open up a field of innovation in actuators, sensing techniques, controllers, as well as component design and assembly.

SUMMARY

Example implementations herein relate to automated generation of interlocking joint features. As described herein, a computing device may receive a virtual model, determine parameters therefrom, and generate cut dimensions specifying a manner in which to modify the virtual model based on a relationship between parameters and cut dimensions. When applied to elements of the virtual model, cut dimensions may form features on those elements that engage or interlock. Once fabricated, objects based on the virtual model and cut dimensions may be secured by engaging the interlocking features, which may be performed by a robotic arm or other machine. Such interlocking features may provide temporary stability during subsequent fastening, adhesive applications, welding, or other additional securing means to form a joint.

In one example, a computer-implemented method is described. The computer-implemented method involves obtaining a virtual model of an object. The virtual model specifies dimensions of a first element, dimensions of a second element, and a spatial relation between the first element and the second element that defines a joint angle. The computer-implemented method also involves obtaining a relationship that correlates element dimensions and joint angles with cut dimensions. The computer-implemented method further involves determining cut dimensions for the first element and the second element based on the relationship, the dimensions of the first element, the dimensions of the second element, and the joint angle. Modifying the first element and the second element according to the cut dimensions produces interlockable features on the first element and the second element. Additionally, the computer-implemented method involves providing an output signal indicative of the cut dimensions.

In another example, a system is described. The system includes at least one processor and a storage device. The storage device has instructions stored thereon that, upon execution by the at least one processor, causes performance of a set of operations. The operations include obtaining a virtual model of an object. The virtual model specifies dimensions of a first element, dimensions of a second element, and a spatial relation between the first element and the second element that defines a joint angle. The operations also include obtaining a relationship that correlates element dimensions and joint angles with cut dimensions. The operations further include determining cut dimensions for the first element and the second element based on the relationship, the dimensions of the first element, the dimensions of the second element, and the joint angle. Modifying the first element and the second element according to the cut dimensions produces interlockable features on the first element and the second element. Additionally, the operations include providing an output signal indicative of the cut dimensions.

In still another example, a non-transitory computer-readable medium is described. The non-transitory computer-readable medium has instructions stored thereon that, upon execution by at least one processor, causes performance of a set of operations. The operations include obtaining a virtual model of an object. The virtual model specifies dimensions of a plurality of elements and spatial relations between elements in the plurality of elements, wherein each spatial relation defines a respective joint angle. The operations also include obtaining a relationship that correlates element dimensions, a number of elements, and joint angles with cut dimensions. The operations further include determining cut dimensions for each element in the plurality of elements based on the relationship and the virtual model. Modifying the plurality of elements according to the cut dimensions produces interlockable features on the plurality of elements. The operations additionally include providing an output signal indicative of the cut dimensions.

In yet another example, a system is described. The system includes a means for obtaining a virtual model of an object. The virtual model specifies dimensions of a first element, dimensions of a second element, and a spatial relation between the first element and the second element that defines a joint angle. The system also includes a means for obtaining a relationship that correlates element dimensions and joint angles with cut dimensions. The system further includes a means for determining cut dimensions for the first element and the second element based on the relationship, the dimensions of the first element, the dimensions of the second element, and the joint angle. Modifying the first element and the second element according to the cut dimensions produces interlockable features on the first element and the second element. Additionally, the system includes a means for providing an output signal indicative of the cut dimensions.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 3B illustrates a perspective view of a virtual model with overlaid cut dimensions, according to an example implementation.

FIG. 3C illustrates a perspective view of the virtual model with the cut dimensions applied, according to an example implementation.

FIG. 4 is a schematic block diagram of a cut dimension generation pipeline, according to an example implementation.

DETAILED DESCRIPTION

Figure 1A:
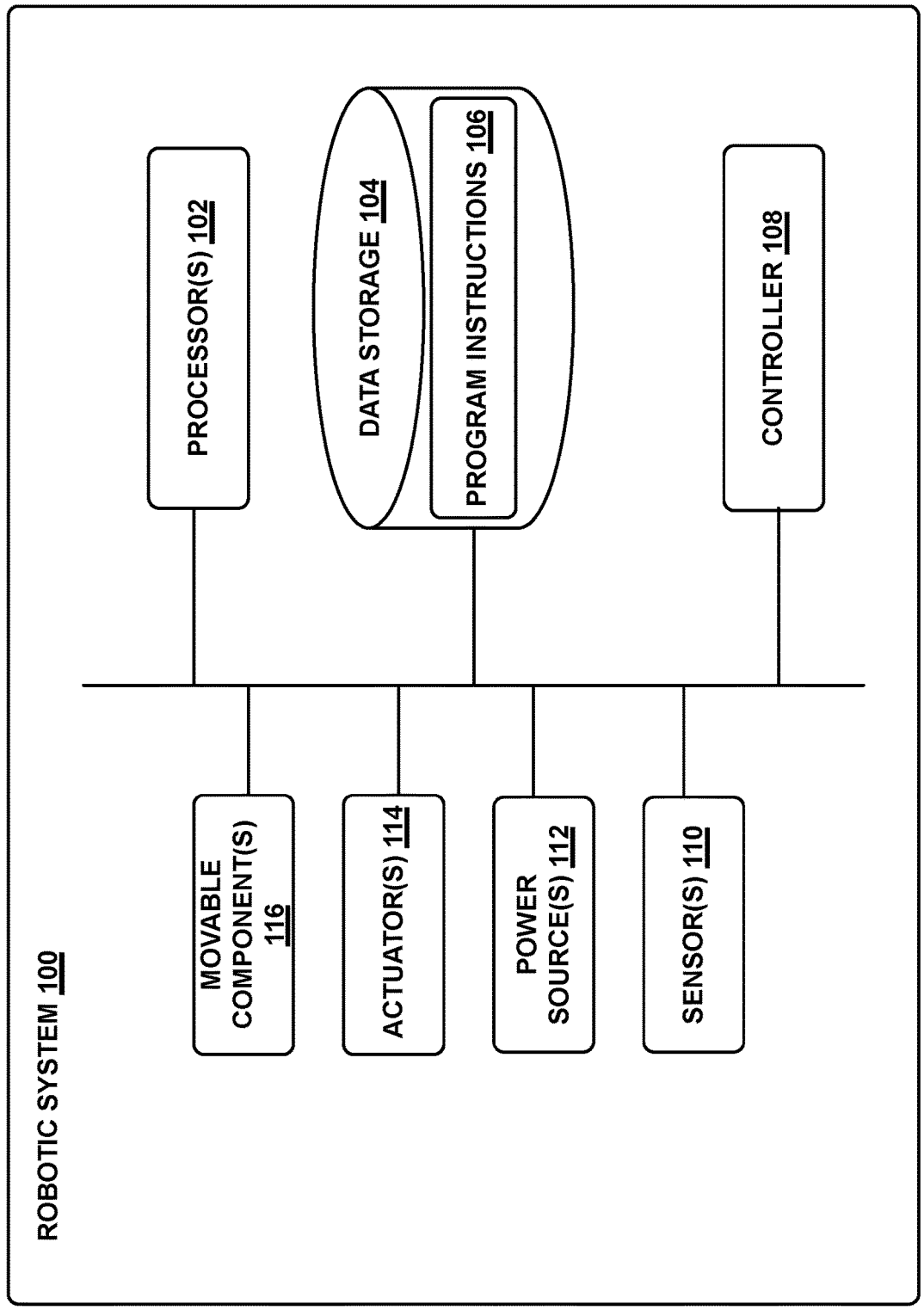
FIGS. 1A and 1B illustrate an example robotic system, according to an example implementation.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. OVERVIEW

Some manufacturing processes involve assembling or joining two or more pieces of material together to form complex shapes or items. The pieces may be secured to each other by way of an adhesive (e.g., glue, resin, cement, etc.), fusion (e.g., welding, induction, etc.), fasteners (e.g., nails, screws, etc.), interlocking geometries (e.g., notches, slots, etc.), or some combination thereof. The manner in which the pieces are joined may depend on the expected physical demands on the joint, the materials used, and the purpose of the joint. Typically, the design aspects of a particular joint depend upon specific features of that joint. When mass producing some item, these design aspects may be specified once and reused for each item being constructed. However, for small-scaled production and prototyping, joint geometries are often manually reconfigured for each design iteration.

Advances in robotics have led to an increased prevalence of the usage of robotic arms in manufacturing and assembly processes. Some processes involve engaging separate components with each other to form an assembled item. Verifying that two components have been successfully engaged typically involves imaging the region where the components form a joint and processing the captured images using computer vision techniques.

Example implementations herein relate to automated generation of interlocking joint features. A virtual model of an object may specify information about two or more elements, such as their dimensions and spatial relations among the elements. A computing device may store a relationship that correlates one or more parameters of the virtual model (e.g., the number of elements, joint angles, the dimensions of the elements, the shape or geometry of the elements, etc.) with cut dimensions. The cut dimensions may define a manner in which to modify the elements to form features on those elements capable of interlocking with each other. The computing device may receive the virtual model (or parameters based on the virtual model) and generate cut dimensions for the elements in the virtual model. The cut dimensions may then be provided to subsequent fabrication processes to physically produce the elements.

Interlocking joint features may include some combination of notches, wedges, fingers, or other protrusions whose geometries are congruent (or approximately congruent) with corresponding holes, slots, or other spaces. An example set of interlocking joint features (which are illustrated in FIGS. 3A-3F) cut from hollow cylinders may be a protruding wedge from one cylinder that fits into a slot of another hollow cylinder.

A given relationship for generating cut dimensions may only be applicable to a particular shape, a particular number of elements that form a joint, a particular angle or range of angles, or another combination of parameter conditions. In some implementations, a computing device may store a library of relationships, each of which correspond to one or more parameter conditions. For instance, a particular relationship may generate cut dimensions for joints involving three cylindrical elements each forming obtuse angles with each other. The computing device may receive the virtual model and determine an appropriate or corresponding relationship to utilize in generating cut dimensions for the virtual model's elements.

Interlocking joint features on workpieces can provide a variety of benefits. For instance, they may serve as guides for aligning two or more pieces together to form a joint. In addition to improving alignment, interlocking features may provide a force- or torque-based indication that two or more pieces have been joined together (e.g., when a protrusion has fully engaged with a slot, there is a substantial increase in resistance to further movement). As another example, interlocking joint features may be generated to provide for an increased surface area available at which bonds or adhesives may be applied. A large surface area may provide for increased joint strength once adhesives have cured. A relationship for parametrically generating cut dimensions that form these joint features may serve to determine cut dimensions that maximize (or otherwise give preference to) this surface area. Furthermore, some interlocking joint features may act to connect electrical signals (or other conduits) running through a material or object.

Interlocking joint features may also serve to provide temporary stability during assembly of an item. For example, corresponding interlocking features may constrain the movement of two or more pieces after the features have begun to engage, improving assembly precision by guiding the pieces together to form a joint. As another example, corresponding interlocking features may be self-supporting, such that subsequent assembly processes may be carried out with the two or more temporarily joint pieces before they are bonded to each other.

By generating cut dimensions that produce geometric features that interlock or otherwise engage, a part or workpiece may be precisely assembled without additional alignment hardware (e.g., a jig). Once corresponding interlocking features have engaged, a robotic manipulator or other device may employ a simple motion profile (e.g., insert, then twist), allowing the features on the items being joined to guide the pieces into place without complex robotic control (e.g., tracking and rigidly holding two pieces in specific 3-dimensional positions and orientations). In this manner, the amount of and/or rate of errors during manufacturing or assembly may be reduced.

II. EXAMPLE ROBOTIC SYSTEMS

Referring now to the figures, FIG. 1A shows an example configuration of a robotic system 100. Robotic system 100 may be any device that has a computing ability and interacts with its surroundings with an actuation capability and/or with ability to emit/generate physical phenomena such as light and/or sound, among others. For instance, the robotic system 100 may be a robotic arm, a humanoid robot, or a quadruped robot, among others. In other examples, robotic system 100 may define a vehicle, a watch, a washing machine, actuated blinds, a conveyer belt, a speaker, or a light bulb, among many other examples. Additionally, the robotic system 100 may also be referred to as a robotic device, a robotic manipulator, or a robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only and robotic system 100 may include additional components and/or have one or more components removed without departing from the scope of the disclosure. Further, note that the various components of robotic system 100 may be arranged and connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, structured-light, and/or a time-of-flight camera), motion sensors (e.g., gyroscope, accelerometer, inertial measurement unit (IMU), and/or foot step or wheel odometry), and/or range sensors (e.g., ultrasonic and/or infrared), among others. The sensor(s) 110 may provide sensor data to the processor(s) 102 to allow for appropriate interaction of the robotic system 100 with the environment. Additionally, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in robotic system 100). In other cases, an actuator may be a linear actuator that may be used in systems involving straight line motion. In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

The above description of processor(s) 102, data storage 104, program instructions 106, sensor(s) 110, and power source(s) 112 may apply to any discussion below relating to the respective component being used in another system or arrangements. For instance, FIGS. 2A and 3A (among other possible figures) illustrate processors, data storage, program instructions, sensors, and/or power sources as being incorporated in other arrangement. These components at issue may thus take on the same or similar characteristics (and/or form) as the respective components discussed above in association with FIG. 1A. However, the components at issue could also take on other characteristics (and/or form) without departing from the scope of the disclosure.

Figure 1B:
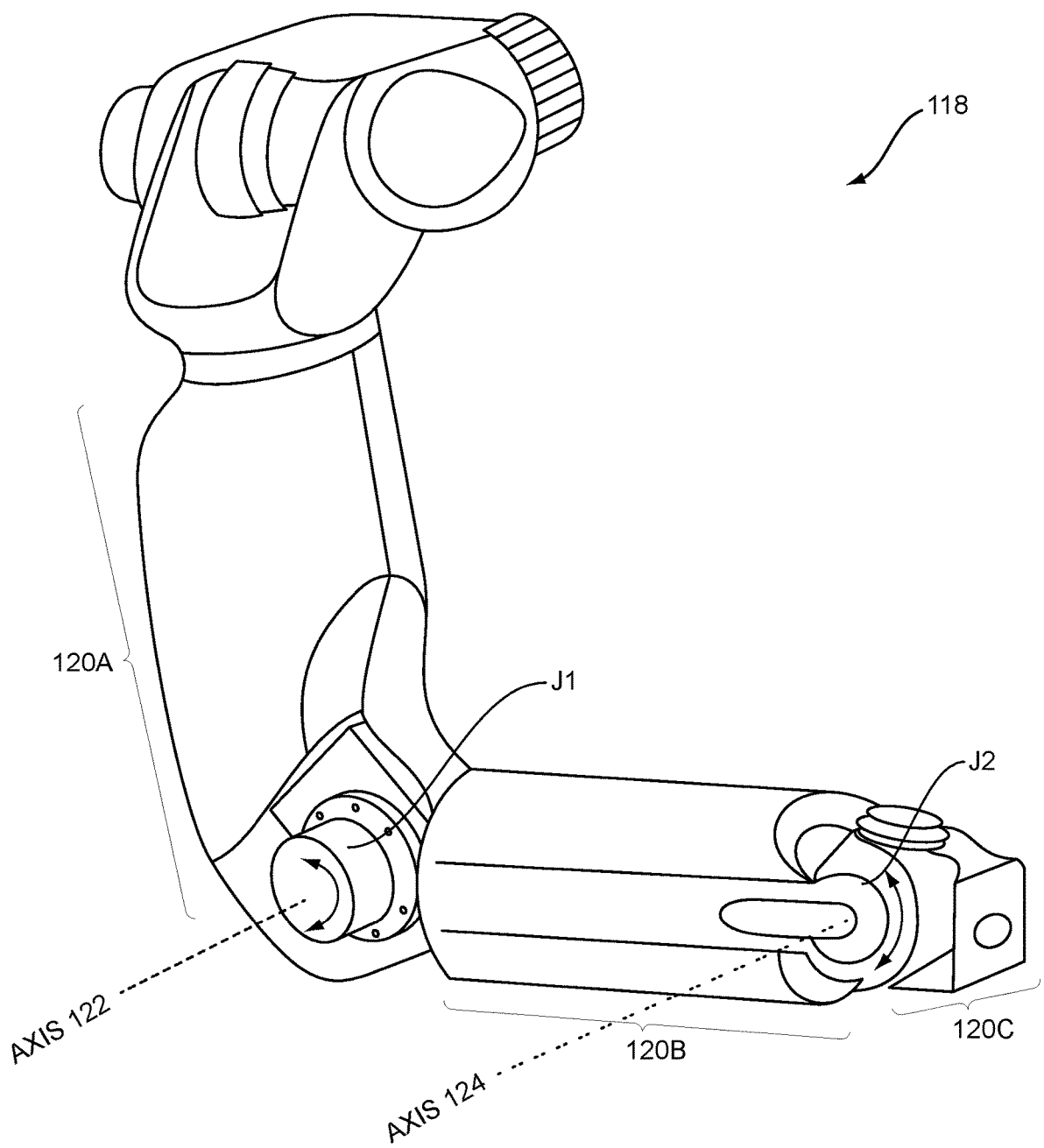

A robotic system 100 may take on various forms. To illustrate, refer to FIG. 1B showing an example robotic arm 118. As shown, the robotic arm 118 includes movable component(s) 116 such as appendages 120A, 120B, and 120C, among others. Additionally, the robotic arm 118 includes joints J1 and J2, each coupled to one or more actuators (not shown) such as actuator(s) 114. The actuators in joints J1 and J2 may operate to cause movement of various movable component(s) 116 such as appendages 120A, 120B, and 120C. For example, the actuator in joint J1 may cause movement of appendage 120B about axis 122 (e.g., resulting in rotation about an axis of joint J1). Whereas, the actuator in joint J2 may cause movement of appendage 120C about axis 124 (e.g., resulting in rotation about an axis of joint J2). Other examples may also be possible.

Given this arrangement, a robotic system 100, such as robotic arm 118 or any other machinery, may assist with or otherwise carry out fabrication of one or more objects. In particular, as noted, the robotic system 100 may have one or more fabrication tools and the robotic system 100 may use one or more of those fabrication tools to fabricate an object out of a substrate. These fabrication tools may include a cutter, a slitter, a drill, a saw, a blade, and/or a polisher, among others. Additionally, the robotic system may receive fabrication instructions (e.g., from a control system) in accordance with which the robotic system may fabricate an object. These instructions may specify a tool to be used, a portion of a substrate to be removed, an extent of the portion that should be removed, a shape in accordance with which the portion should be removed, and/or an order of fabrication, among any other feasible instructions. Other arrangements are possible as well.

Furthermore, a robotic system 100, such as robotic arm 118 or any other machinery, may assist with or otherwise carry out assembly of two or more objects. In particular, the robotic system 100 may have one or more actuators, end effectors, or other means of gripping to join two or more objects together. In some instances, the robotic system 100 may receive assembly instructions (e.g., from a control system) in accordance with which the robotic system 100 may assemble an object. These instructions may specify a spatial relation between the two objects, an amount of force to apply in joining the two objects, an order with which to assemble the two objects, and/or any other feasible set of instructions. Other arrangements are possible as well.

A robotic system 100 may also include a control system that may include a combination of processors, data storage, and program instructions. In practice, a control system may take on one of various forms. For instance, a control system may take the form of a chip set, a server system, a digital signal processor, a programmable logic controller, and/or a sampled-data system, among other possibilities. Moreover, a control system may be located on a robotic arm, or may be in communication with a robotic arm and/or may be distributed across various locations, among other options. By way of example (and without limitation), a control system may be operable to aid in controlling the physical assembly of elements. Other examples are also possible.

In some cases, a control system may be incorporated within and/or may otherwise be in communication with a computing system (not shown). In such cases, the computing system may take the form of a desktop computer, a laptop, a tablet, a wearable computing device, and/or a mobile phone, among other possibilities.

As such, the computing system may be configured to receive input from a user, such as via a graphical user interface (GUI) for instance. Generally, this input may be specifically provided via touch-based interface (e.g., a touch screen) or via a keyboard or the like. Also, this input may be representative of a shape of a desired object and/or of any other virtual model, among others. In particular, the virtual model may specify a 3D shape of the desired object, a size of the desired object, dimension of the desired object, and/or an orientation of the desired object once completed, among others. In this manner, a control system may ultimately receive data indicative of a virtual model defining 3D shapes of physical objects.

A control system may be in communication with the various entities found in an environment or via at least one communication link. A communication link may be a wired or a wireless communication link. More specifically, a wired link may include, for example, a parallel bus or a serial bus such as a Universal Serial Bus (USB). Whereas, a wireless link may include, for example, Bluetooth, NFC, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11). In other examples, the arrangement may include access points through which the various systems may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

Further, a control system may be in communication with the robotic system 100. In this way, the control system transmit instructions to the robotic system 100 so as to direct the robotic system 100 to fabricate and/or assemble physical objects in accordance with virtual model data defining 3D shapes of elements and/or cut dimensions defining a manner in which to geometrically modify elements within a virtual model. Moreover, a control system may receive communications from the robotic system 100, such as communications specifying progress of fabrication or assembly processes.

III. EXAMPLE COMPUTING DEVICES

Figure 2:
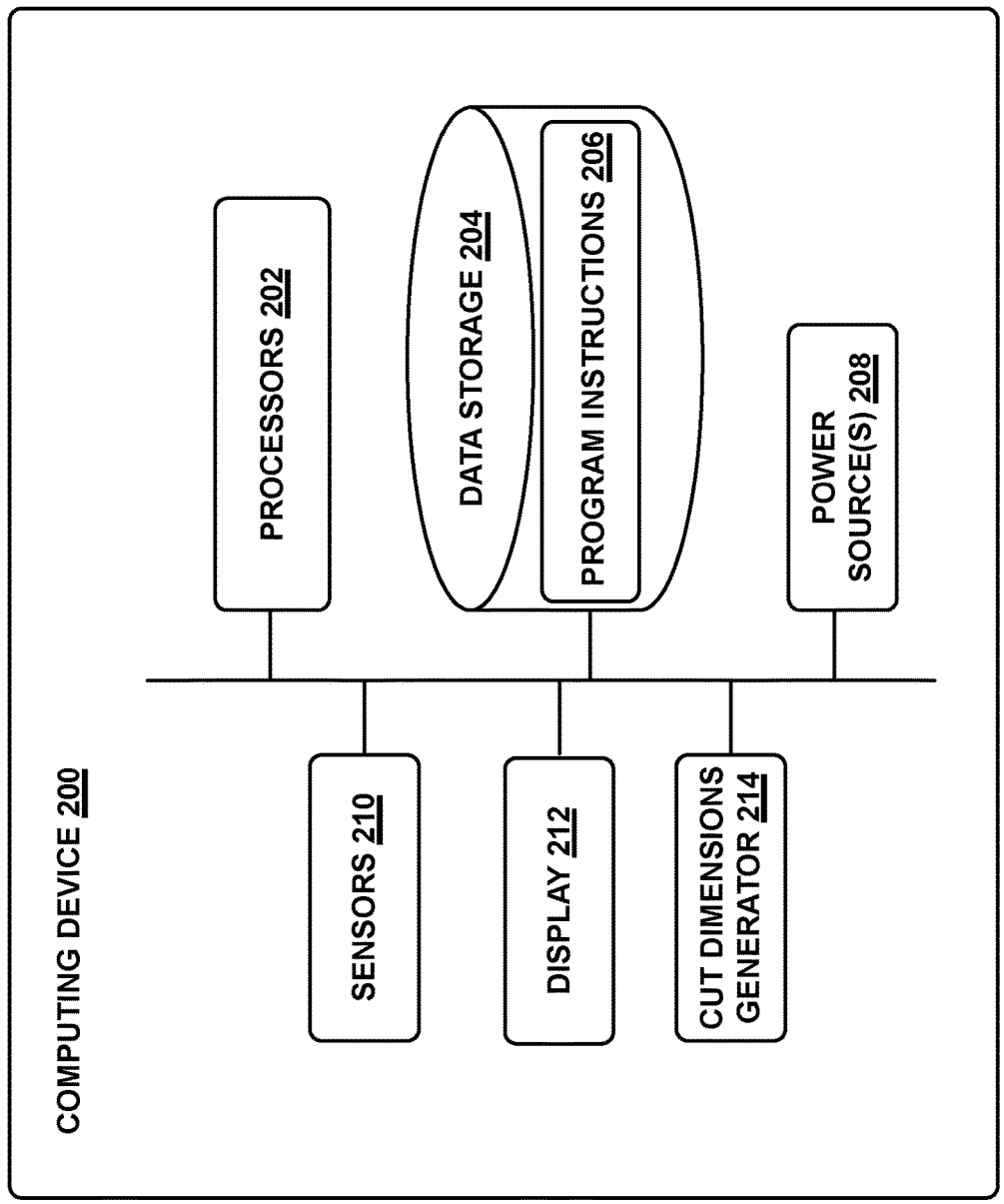
FIG. 2 illustrates an example computing device, according to an example implementation.

FIG. 2 is a block diagram showing components of an example computing device 200 that includes one or more processors 202, data storage 204, program instructions 206, power source(s) 208, sensors 210, display 212, and cut dimensions generator 214. Note that the computing device 200 is shown for illustration purposes only and computing device 200 may include additional components and/or have one or more components removed without departing from the scope of the disclosure. Further, note that the various components of computing device 200 may be arranged and connected in any manner.

Display 212 may take on any form (e.g., LED, LCD, OLED, etc.). Further, display 212 may be a touchscreen display (e.g., a touchscreen display on a tablet). Display 212 may show a graphical user interface (GUI) that may provide an application through which the user may interact with the systems disclosed herein.

Additionally, the computing device 200 may include cut dimensions generator 214, which may include a combination of software and/or hardware components that collectively carry out cut dimension determination as described herein. The cut dimensions generator 214 may include a combination of program instructions for executing cut dimension determination. In some instances, the cut dimensions generator 214 may include a GUI, allowing a user to control a software program. As one example, the GUI may allow a user to select a particular virtual model (from a storage device or over a network) with which to perform cut dimension determination on. Other examples are also possible.

A computing device 200 may take on various forms. For instance, the computing device 200 may take the form of a desktop computer, a laptop, a tablet, a wearable computing device, and/or a mobile phone, among other possibilities.

IV. EXAMPLE GENERATION OF CUT DIMENSIONS

As described herein, "cut dimensions" may generally refer to information about a manner in which to modify or alter the geometry of one or more elements, workpieces, or other objects. In some instances, altering the geometry of an element may involve cutting, drilling, laser cutting, or otherwise physically removing a portion or portions of the element defined by the cut dimensions. In other instances, altering the geometry of an element may involve storing a digital or virtual representation of the cut dimensions for use in a subsequent fabrication process, or outputting a digital or virtual representation of a modified element with the cut dimensions applied (e.g., with portions of the element being "deleted" or otherwise considered as space). Cut dimensions may specify portions of an element to remove such that the remaining portions of the element form protrusions, notches, or other engageable features.

As described herein, a "virtual model" may refer to a digital representation of a two-dimensional (2D) or three-dimensional (3D) object. A virtual model may include one or more elements, the geometries and dimensions of those elements, and their spatial relations with respect to each other. Each element may include solid regions, spaces, curves, or other metadata (e.g., information about the material of the element, tolerances, etc.). Virtual models may be stored as data on a computing device's memory or storage device, transmitted to other computing devices, or modified by computational processes (such as those described herein).

In some instances, an object or part may be scanned to generate the virtual model. The virtual model of the scanned object may be analyzed to determine cut dimensions. As one example, two separate objects may be scanned to generate respective virtual models. These virtual models may be designated to be joined according to one or more parameters. A computing device may generate cut dimensions on or more of those virtual models that would form interlockable features on those scanned objects if the cut dimensions were applied to the objects. In this manner, two physical objects may be joined together, without any predetermined or stored virtual model.

Figure 3A:
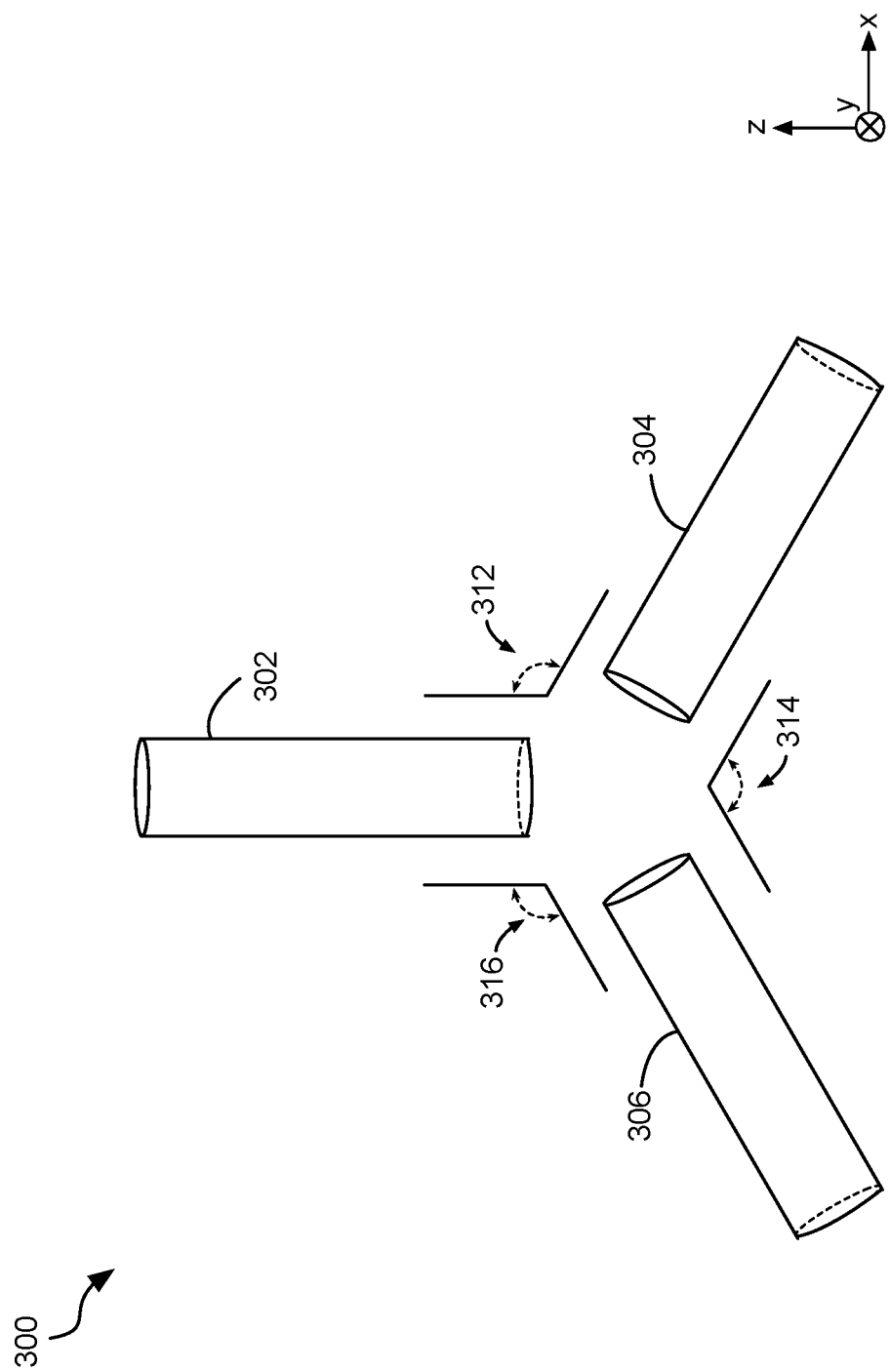
FIG. 3A illustrates a perspective view of a virtual model, according to an example implementation.

FIG. 3A illustrates a perspective view of an example virtual model 300 with elements 302, 304, and 306. In the following example, the virtual model 300 with three hollow cylindrical elements serves as the basis for generating cut dimensions. As illustrated in FIGS. 3A-3F, the three elements join at approximately equal angles 312, 314, and 316 (about 120° between each element) along a single plane (i.e., the longitudinal axes of the cylinders are coplanar in the x-z plane). As illustrated in FIG. 3A, the spatial relation between element 302 and element 304 defines angle 312; the spatial relation between element 304 and element 306 define angle 314; and the spatial relation between element 306 and element 302 define angle 316.

Although the cut dimensions depicted in the figures correspond to this specific virtual model 300, the techniques disclosed herein may be applied to a wide variety of virtual models (e.g., any number of elements, any kind of spatial arrangement, etc.).

In some implementations, a computing device may receive data of the virtual model 300 and determine one or more parameters based on that virtual model. As described herein, a "parameter" may be any measurable aspect of a virtual model, an element, or a combination of elements. Some example parameters include the number of elements in the virtual model, the joint angles between elements (defined by the spatial relation between those elements), dimensions or geometries of an element (e.g., length, width, depth, shape, etc.), the material of an element (e.g., metal, plastic, wood, etc.), properties of those materials (e.g., related to strength, flexibility, etc.), or any other kind of information relating to a virtual model or its elements.

Such parameters may be stored in the virtual model as metadata, or may be determinable from the virtual model's data. For instance, the angle between two or more elements may not be predetermined, but can be measured by a computing device by applying trigonometric functions to vectors defining the positions and orientations of two elements. As described herein, "determining a parameter" encompasses both reading stored information as parameters, as well as determining parameters from data within virtual model.

The determined parameters may serve (at least partially) as the basis for generating cut dimensions. A relationship—such as a function, equation, mathematical relation, statistical relation, or some combination thereof—may correlate parameter values with one or more cut dimensions. One or more parameter values may affect the length, width, depth, size, shape, or other geometric property of the cut dimensions (or a portion of the cut dimensions). The specific manner in which an aspect of the cut dimensions is affected by a parameter value may vary for different joint angles, shapes, geometries, or other requirements.

FIG. 3B illustrates a perspective view 320 of example cut dimensions overlaid onto elements 302, 304, and 306. Based on a relationship and the parameters of the virtual model 300, a computing device determines the geometries of the cut dimensions 320 (illustrated using dotted lines in FIG. 3B). In this example, the cut dimensions 320 specify a set of cuts to form spaces 322, 332, and 342, protrusions 324, 334, and 344, and slots 326, 336, and 346. In FIG. 3B, protrusion 324 is engageable with (i.e., fits into or interlocks with) slot 346, protrusion 334 is engageable with slot 326, and protrusion 344 is engageable with slot 336. Thus, when elements 302, 304, and 306 are brought together, each protrusion engages with a respective slot, thereby holding the elements 302, 304, and 306 in place to form a three-way joint. An illustration 350 of the cut dimensions applied to the virtual model is shown in FIG. 3C.

Figure 3D:
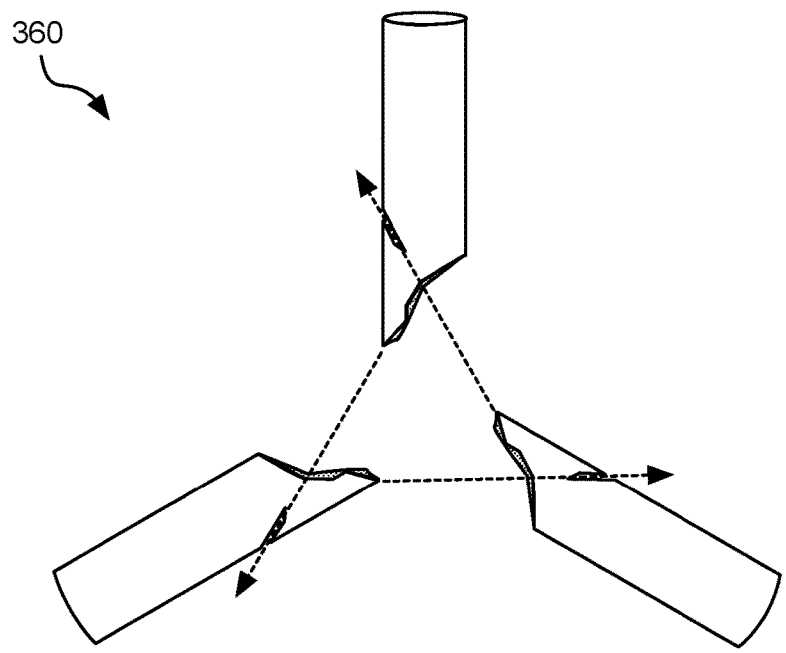
FIGS. 3D, 3E, and 3F illustrate perspective views of an assembly process of the virtual model, according to an example implementation.
Figure 3E:
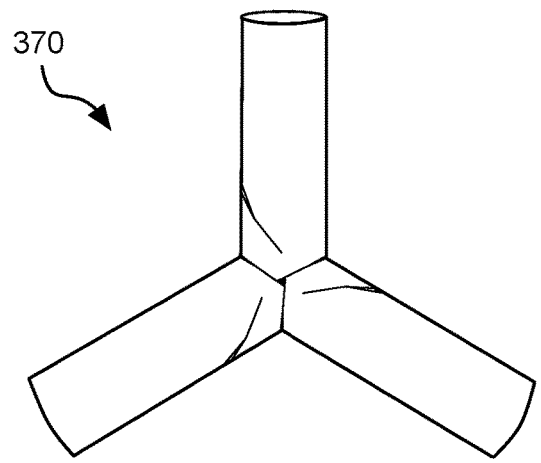
Figure 3F:
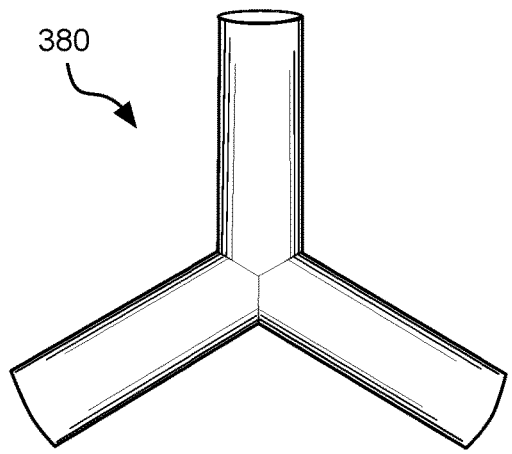

FIGS. 3D, 3E, and 3F illustrate the assembly of the three elements with the cut dimensions applied to form a three-way joint. The illustration 360 in FIG. 3D shows arrows that correlate protrusions with slots. Between illustration 360 in FIG. 3D and illustration 370 in FIG. 3E, the three elements are moved closer to each other. FIG. 3E illustrates the three elements arrange to be approximately interlocking (with slight gaps shown to show how the pieces fit together). Illustration 380 in FIG. 3F illustrates the three elements being completely engaged.

FIG. 4 is a schematic block diagram 400 of a cut dimension generation pipeline, according to an example implementation. The pipeline includes a virtual model 410, a computing device 430, and cut dimensions output 440. The virtual model 410 includes element(s) 412 and spatial relation(s) 414. The computing device 430 includes relationship(s) 432.

The virtual model 410, as described above, may be data that represents a 2D or 3D object or combination of objects. The virtual model 410 may be stored in memory or a storage device, such as a hard disk drive or solid state drive. The virtual model 410 may also be provided as a data transmission over a network (e.g., a local area network (LAN), the Internet, etc.). In addition to the element(s) 412 and the spatial relation(s) 414, the virtual model 410 may include metadata and other information related to its source, its file type, or any other information. As one example, a virtual model 410 may be a computer aided design (CAD) drawing either generated programmatically or produced by a human via CAD drawing software.

The element(s) 412 may the individual object or objects present within the virtual model 410. The element(s) 412 may include dimensions, geometries, and be composed of particular materials. The properties of each element may serve as a basis for determining parameters that may affect the cut dimensions generated by the computing device 430.

The spatial relation(s) 414 may be information about the positions and/or orientations of element(s) 412 with respect to a reference position or orientation. For example, the virtual model 410 may include a coordinate system within which the positions and orientations of each element is defined. A spatial relation may define, the position and/or orientation of one element with respect to another element (i.e., where one of those elements serves as the "reference" for the other). Regardless of the particular implementation, the spatial relation(s) 414 generally refers to information about the arrangement of elements 412 with respect to each other.

The virtual model 410 is provided as input to the computing device 430. In some implementations, all of the data incorporated within the virtual model 410 is provided to the computing device 430, which may use portions of the data to determine the cut dimensions. In other implementations, parameters relevant to relationship(s) 432 may be determined by a separate computing device or process, and those parameters are passed to the computing device 430 to generate the cut dimensions for the virtual model.

The computing device 430 may be any device that includes a processor and memory, among other possible components. The computing device 430 may be similar to the computing device 200 illustrated in FIG. 2. The computing device 430 may have stored thereon relationship(s) 432. The relationships—such as a function, equation, mathematical relation, statistical relation, or some combination thereof—may correlate parameter values (e.g., aspects of element(s) 412 and/or spatial relation(s) 414) with one or more cut dimensions. In some instances, relationship(s) 432 may include a library of relationships, with each relationship being associated with a particular type of joint, a range of angles, a number of elements that form a joint, or any other parameter.

The computing device 430 may—based on parameters derived from the virtual model 410 and the relationship(s) 432—provide the cut dimensions output 440 for use in subsequent computational processes, to be stored in a storage device, transmitted over a network, be used in a simulation, or otherwise serve as a basis for a manufacturing, fabrication, or assembly process.

V. EXAMPLE LIBRARY OF RELATIONSHIPS

Many different types of geometries may be used to form engageable or interlockable features for joining two or more elements. Some geometries may apply to particular element shapes, a range of joint angles, or a particular number of elements. For instance, some joint types may apply to acute joint angles, but are not suitable for obtuse joint angles.

Techniques described herein involve storing a library of relationships, where each relationship is associated with one or more conditions. Following the example above, a library of relationships may contain a relationship that applies to acute angles, and a different relationship that applies to obtuse angles. During operation, a computing device may use parameters (such as joint angle(s)) of a virtual model to determine which relationship to use in generating cut dimensions. In this manner, a cut dimension generator may automate a broader range of joint types.

Figure 5:
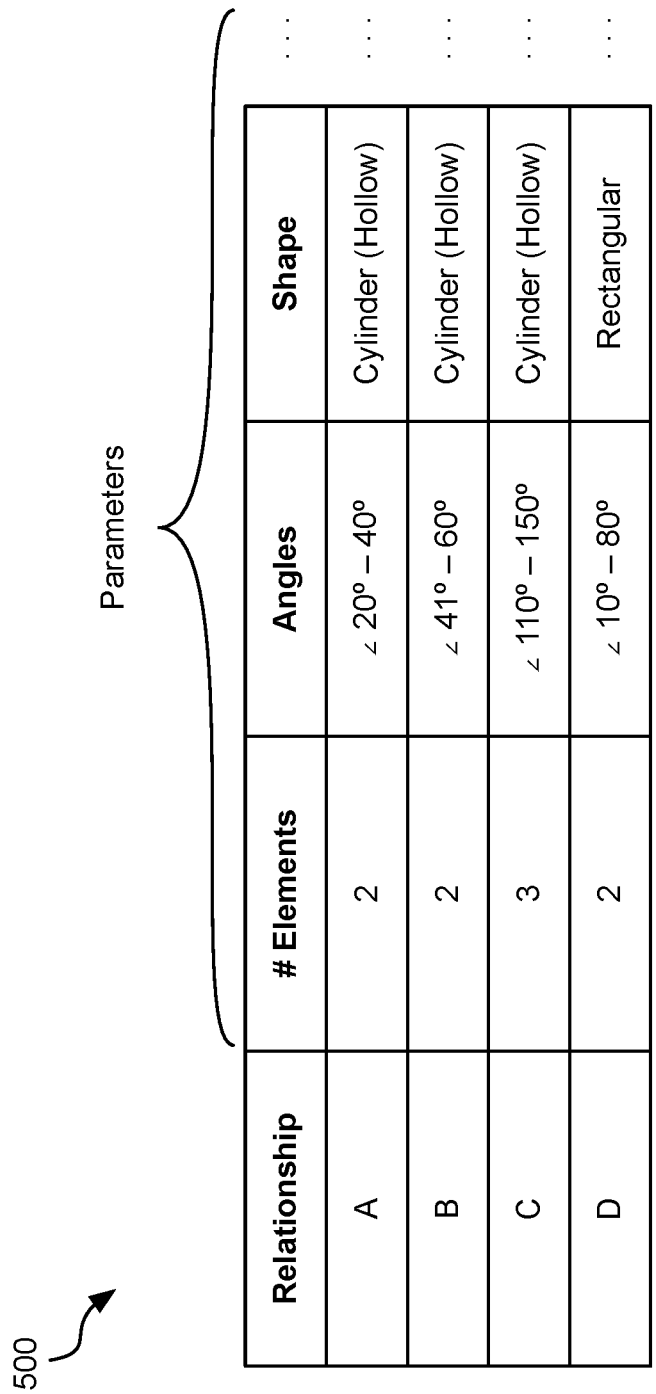
FIG. 5 is a table illustrating an example joint library, according to an example implementation.

FIG. 5 is a table 500 illustrating an example library of relationships, according to an example implementation. Although specific parameters and parameter values are shown in table 500, they are provided for explanatory purposes only. It should be understood that a given library of relationships may contain any number of relationships, parameter fields, without departing from the scope of the present application.

In table 500, relationships A, B, C, and D are associated with a combination of three parameters: the number of elements that form the joint, a range of joint angles, and a shape geometry. As one example, relationship A applies to joints formed from two hollow cylindrical elements that form a joint angle between 20° and 40°. During operation, a computing device may determine values for the parameters in a library of relationships, and select the relationship that corresponds to that specific combination of parameters.

Ellipses are shown below and to the right of table 500 in FIG. 5, illustrating that there may be any number of relationships in the table 500, and that any number of parameters may be associated with each relationship. Furthermore, a given relationship may not depend on all parameters in the table 500; for example, a given relationship may apply to all possible joint angles (e.g., from 0° to 180°). In such instances, the parameter may be specified in the table 500 as spanning from 0° to 180°, as a blank entry (indicating that the angle is not considered), or an entry with a token value (e.g., "all" indicating that all angles may be considered).

IV. EXAMPLE METHODS

Figure 6:
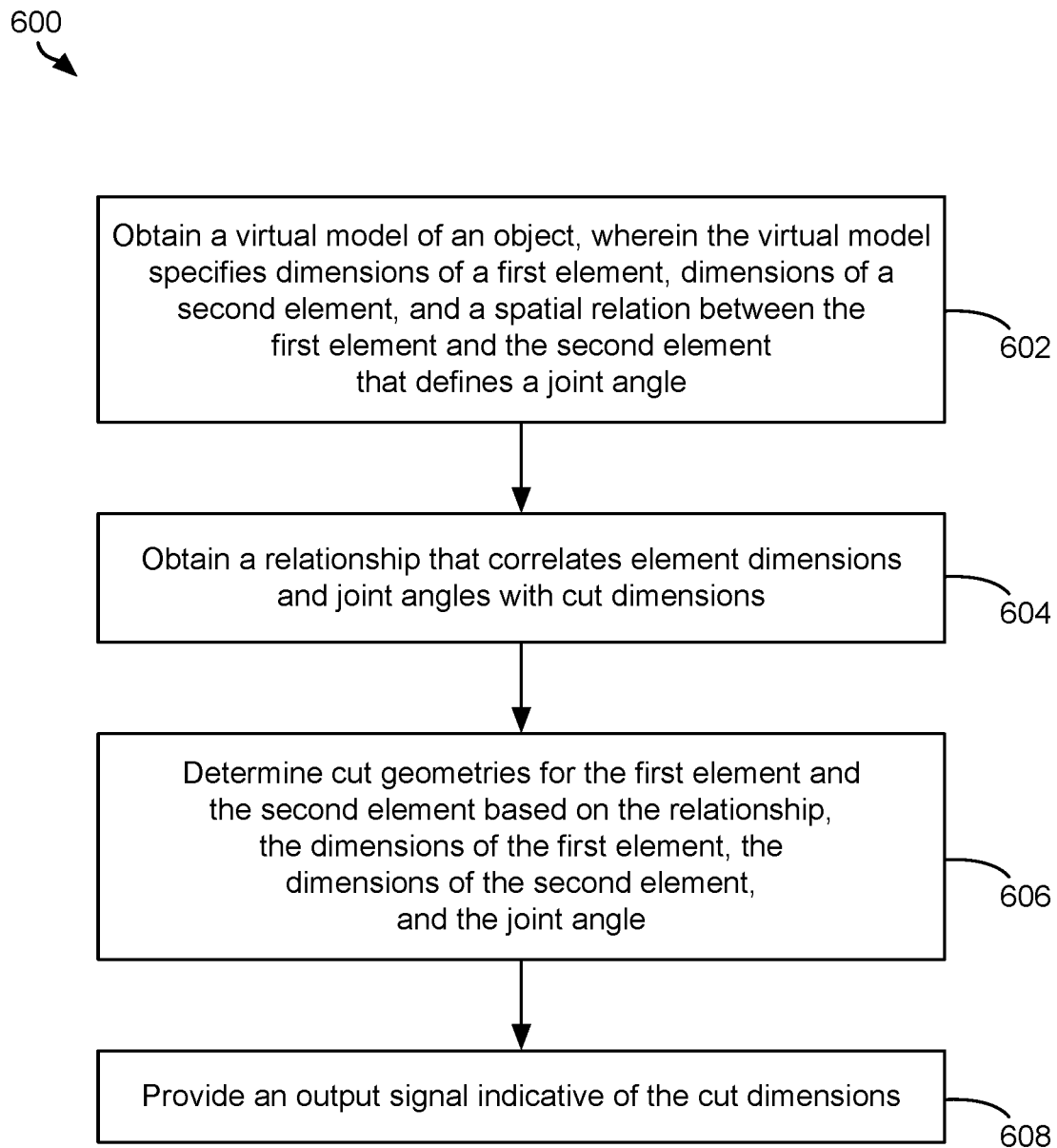
FIG. 6 is a flowchart of an example method, according to an example implementation.

FIG. 6 is a flowchart of operations 600 for determining a vector of a force applied against a movable structure of a force sensor, according to an example implementation. Operations 600 shown in FIG. 6 present an implementation that could be used by computing devices or control systems. Operations 600 may include one or more actions as illustrated by blocks 602-608. Although the blocks are illustrated in sequential order, these blocks may also be performed in parallel, and/or in a different order than those described herein. Also, the various blocks may be combined into fewer blocks, divided into additional blocks, and/or removed based upon the directed implementation.

In addition, the operations 600 and other operations disclosed herein show functionality of one possible implementation. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device.

In addition, one or more blocks in FIG. 6 may represent circuitry that is wired to perform the specific logical operations.

A. Obtain a Virtual Model

At block 602, the computing device obtains a virtual model of an object. The virtual model specifies dimensions of a first element, dimensions of a second element, and a spatial relation between the first element and the second element that defines a joint angle.

As described above, a "spatial relation" may refer to information about the relative positions and/or orientations of elements, either with respect to each other or with respect to a reference position, orientation, and/or axes. In some implementations, a spatial relation may refer to the position and/or orientation in 3D space with respect to a set of axes (e.g., x-, y-, and z-axes) having a reference location (e.g., an origin). Regardless of the implementation, parameters such as joint angles may be determined based on a spatial relation.

Although the operations 600 describe a first element and a second element, any number of elements may be present within the virtual model, with two or more elements meeting at a position to form a joint. Relationships may define a manner in which to generate cut dimensions for joints having more than two elements.

In some instances, the virtual model may represent a portion of an object or item. As an example, a table may include multiple legs supporting a tabletop. A virtual model may, for instance, include geometric data for one of the legs and a portion of the tabletop where the leg forms a joint with the tabletop. Generally speaking, a "virtual model" described herein may at a minimum include geometric information related to a joint (although other information may also be stored in the virtual model).

In some cases, a virtual model may specify that two or more elements meet to form a joint. For instance, portions of the two elements in the virtual model may overlap or occupy the same space, indicating that the two elements are to be joined during fabrication. As another example, a virtual model may include metadata indicating that a joint is to be created with two elements, although the elements themselves are spatially separated within the model and not overlapping. As yet another example, a virtual model may not indicate that two elements are to be joined, and a human operator or automated computational process interacting with computational geometry software may provide instructions to generate cut dimensions to form a joint between two elements. Other kinds of virtual models and/or joint specifications are also possible.

B. Obtain a Relationship

At block 604, the computing device obtains a relationship that correlates element dimensions and joint angles with cut dimensions. In various implementations, a relationship may include a combination of formulae, mathematical or statistical relationships, computational functions or algorithms, or any combination thereof.

In some implementations, relationship may "parameterize" one or more aspects of the cut dimensions. As one example, a relationship may relate the number of elements being joined and the circumference of the elements with the length of a slot (e.g., the length of the slot could be the circumference of an element divided by the number of elements being joined, among other possible relationships).

A "relationship" as described herein may encompass two or more different "parameterizations" that affect different aspects of cut dimensions. For example, some input parameters may affect the width of a slot, while other input parameters may affect the length of a slot. Other examples are also possible.

A relationship may also correlate input parameters to types of features or geometries produced by the cut dimensions. For instance, interlocking features produced for hollow elements (e.g., wedges and slots, among others) may be different from interlocking features produced for solid elements (e.g., mortise and tenon, among others).

In some implementations, a relationship may be obtained from a library of relationships, as described above. The library of relationships may specify one or more conditions for each relationship. The operations 600 may additionally involve a computing device selected or otherwise determining a particular relationship from a library of relationships based on parameters such as joint angles, element shapes, element dimensions, and the number of elements coming together to form a joint.

In some implementations, a relationship may be a computational process that solves a particular problem, maximizes or minimizes a real function, or otherwise optimizes over one or more costs and/or constraints. For instance, it may be desired for cut dimensions to provide a large surface area with which to join elements together (e.g., to create a stronger joint after applying adhesive or welding the two elements together). A relationship may evaluate multiple potential cut dimensions, determine the total amount of surface area available for welding, and select a particular cut dimension that has the largest surface area. In other instances, it may be desired for cut dimensions to be compatible with a particular curing process. For example, cut dimensions that are self-supporting may be preferably used if the curing rate is short; in contrast, longer curing rates—such as with an adhesive under an extended-duration load—may not benefit from cut dimensions that form a self-supporting structure. Other considerations or optimizations are also possible.

C. Determine Cut Dimensions

At block 606, the computing device determines cut dimensions for the first element and the second element based on the relationship, the dimensions of the first element, the dimensions of the second element, and the joint angle. Modifying the first element and the second element according to the cut dimensions produces interlockable features on the first element and the second element.

As described herein, "interlockable" may generally refer to a quality or characteristic of a feature on an element that is capable of being engaged with a corresponding feature on another element. Interlockable features may or may not perfectly fit together, depending on manufacturing tolerances or errors accrued during fabrication. Generally speaking, corresponding interlockable features may be some type of protrusion (e.g., dowels, wedges, tenons, fingers, etc.) that engages with some type of space (e.g., holes, slots, notches, pockets, trenches, mortises, etc.). Interlockable features may engage in such a manner that two physical elements could be held in place without assistance; in other instances, interlockable features may "loosely" engage, to provide space for subsequent adhesives, welding, or other joinery materials.

In some implementations, cut dimensions may be separate pieces of information from the elements in the virtual model. For example, the cut dimensions may be provided in the form of instructions to a fabrication machine (e.g., a CNC router, lathe, laser cutter, etc.) indicating a manner in which to modify a workpiece to form the element with interlockable features. In other implementations, cut dimensions may be applied to the elements of the virtual model, such that the geometries of those elements is a combination of solids defined by the elements and spaces defined by the cut dimensions. The modified elements may be provided to, for example, additive manufacturing machines (e.g., 3D printers) to produce physical elements with geometries that include the interlockable features.

As described herein, "cut dimensions" may generally refer to information about the geometries of engageable features that form a joint. These features could be produced in an additive manner (e.g., 3D printing), a subtractive manner (e.g., routers, lathes, laser cutters, etc.), by altering an element (e.g., twisting, bending, shaving, melting, etc.), or some combination thereof. "Cut" may generally refer a manner in which to modify the geometry of a virtual model or virtual element (i.e., "deleting" solid portions to form spaces, among other possibilities). It should be understood that "cut dimensions" can be applied to wide variety of manufacturing processes.

In some circumstances, an element may—prior to generating cut dimensions—include a feature or features with which other features can interlock or engage. For instance, one element may already include a protrusion, and the cut dimensions may specify a corresponding slot on another element based on the size and geometry of that protrusion.

D. Provide an Output Signal Indicative of the Cut Dimensions

At block 608, the computing device provides an output signal indicative of the cut dimensions. In some instances, the output signal may be information about the cut dimensions as they relate to the elements (e.g., the spatial positions on or within the element). In other instances, the output signal may be indicative of a modified element with the cut dimensions virtually applied In some cases, the output signal may be data provided to a memory device or storage device for storage. In other cases, the output signal may be provided to a machine to fabricate, construct, or otherwise produce the element with the cut dimensions. For example, the output signal may be instructions provided to a computer numeric control (CNC) machine or its control system, which causes the CNC machine to carry out operations to produce the element with the cut dimensions. Other examples are also possible.

VII. EXAMPLE COMPUTER-READABLE MEDIUM

Figure 7:
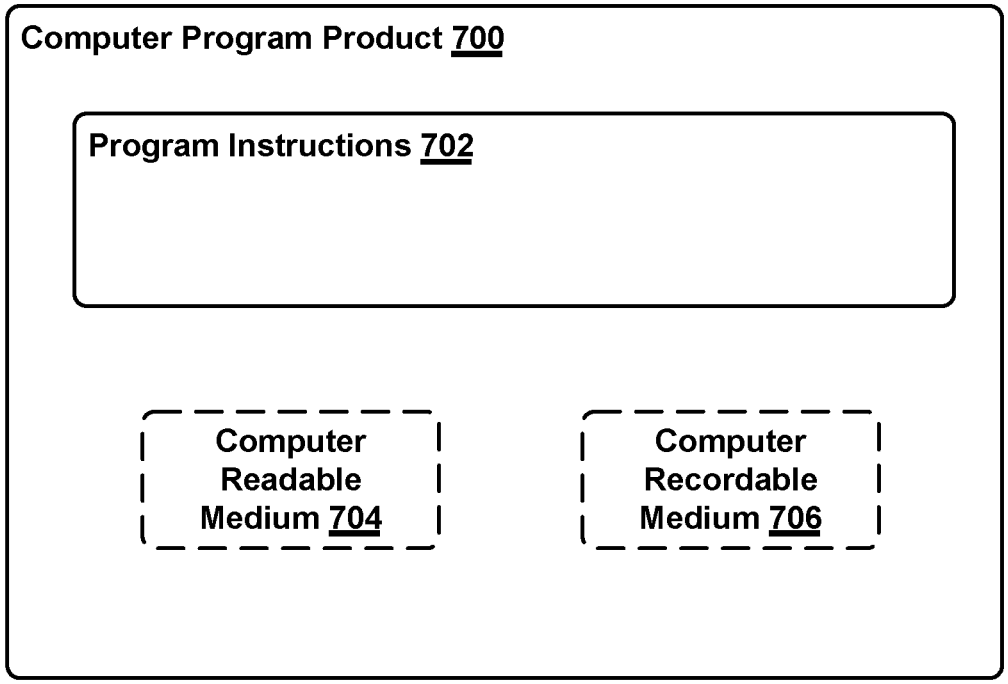
FIG. 7 is a block diagram of an example computer-readable medium, according to an example implementation.

FIG. 7 illustrates an example computer-readable medium configured according to at least some implementations described herein. In example implementations, the example system can include one or more processors, one or more forms of memory, one or more input devices/interfaces, one or more output devices/interfaces, and machine readable instructions that when executed by the one or more processors cause a robotic device to carry out the various operations, tasks, capabilities, etc., described above.

As noted above, the disclosed procedures can be implemented by computer program instructions encoded on a computer-readable storage medium in a machine-readable format, or on other media or articles of manufacture. FIG. 7 is a schematic illustrating a conceptual partial view of a computer program product that includes a computer program for executing a computer process on a computing device, arranged according to at least some implementations disclosed herein.

In some implementations, the example computer program product 700 may include one or more program instructions 702 that, when executed by one or more processors may provide functionality or portions of the functionality described above with respect to FIGS. 1-6. In some examples, the computer program product 700 may include a computer-readable medium 704, such as, but not limited to, a hard disk drive, a Compact Disc (CD), a Digital Video Disk (DVD), a digital tape, memory, etc. In some implementations, the computer program product 700 may include a computer recordable medium 706, such as, but not limited to, memory, read/write (R/W) CDs, R/W DVDs, etc.

The one or more program instructions 702 can be, for example, computer executable and/or logic implemented instructions. In some examples, a computing device is configured to provide various operations, or actions in response to the program instructions 702 conveyed to the computing device by the computer readable medium 704 and/or the computer recordable medium 706. In other examples, the computing device can be an external device in communication with a device coupled to the robotic device.

The computer readable medium 704 can also be distributed among multiple data storage elements, which could be remotely located from each other. The computing device that executes some or all of the stored instructions could be an external computer, or a mobile computing platform, such as a smartphone, tablet device, personal computer, a robot, or a wearable device, among others. Alternatively, the computing device that executes some or all of the stored instructions could be a remotely located computer system, such as a server. For example, the computer program product 700 can implement operations discussed in reference to FIGS. 1-6.

V. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A computer-implemented method comprising:
   obtaining a virtual model of an object that is to be assembled by securing a first element and a second element to each other, the virtual model specifying pre-cut physical characteristics of the first element and the second element, the pre-cut physical characteristics including:
      first pre-cut dimensions of the first element and one or more first physical properties of a material of the first element; and
      second pre-cut dimensions of the second element and one or more second physical properties of a material of the second element;
   determining, using the virtual model and for each of the first element and the second element, cut dimensions that indicate a manner in which the element is to be altered such that the altered first element and the altered second element include interlockable features that are capable of interlocking with each other, including:
      selecting, from a set of element cutting options, one or more element cutting options that correspond to the pre-cut physical characteristics of the first element and the second element, wherein each cutting option correlates cut dimensions with pre-cut physical characteristics of a set of pre-cut elements;
      determining, using the virtual model and the one or more element cutting options, multiple candidate cut dimensions of the first element or the second element; and
      selecting, from the multiple candidate cut dimensions, particular cut dimensions of the first element or the second element based on (i) a physical characteristic of the element after being altered using each of the multiple cut dimensions and (ii) one or more criteria for the physical characteristic of the element;

generating data that indicates the particular cut dimensions of the first element or the second element; and providing the data that indicates the particular cut dimensions to one or more computers that are associated with fabricating or assembling the object.

2. The computer-implemented method of claim 1, wherein the interlockable features include a first slot on the first element, a first protrusion on the first element, a second slot on the second element, and a second protrusion on the second element, wherein a portion of the second protrusion is engageable with the first slot, and wherein a portion of the first protrusion is engageable with the second slot.

3. The computer-implemented method of claim 1, wherein obtaining the virtual model comprises at least one of (i) retrieving data indicative of the virtual model from a storage device or (ii) receiving data indicative of the virtual model via a network.

4. The method of claim 1, wherein the virtual model is of an object that is to be assembled by securing the first element and the second element to each other using an articulated robotic arm.

5. The method of claim 1, wherein:
the object is to be assembled by securing the first element and the second element to each other at a joint angle, and
the cut dimensions are determined based at least on the joint angle.

6. The method of claim 1, wherein the interlockable features are congruent and, when interlocked with each other, form a fixed joint.

7. The system of claim 1, wherein the interlockable features are congruent and, when interlocked with each other, form a fixed joint.

8. The method of claim 1, wherein selecting, from the multiple candidate cut dimensions, particular cut dimensions of the first element or the second element comprises selecting first cut dimensions for the first element based on the one or more criteria and second cut dimensions for the second element based on the one or more criteria.

9. The method of claim 1, wherein determining the multiple candidate cut dimensions comprises:
determining, using at least the virtual model, physical parameters of the first element and the second element;
selecting, from multiple candidate relationships and based on the physical parameters of the first element and the second element, a particular relationship that correlates physical parameters of elements with cut dimensions for the elements; and
determining the multiple candidate cut dimensions using the particular relationship and the physical parameters of the first element and the second element.

10. The method of claim 1, wherein determining the multiple candidate cut dimensions comprises evaluating a surface area for welding the first element to the second element using one or more criteria, wherein the particular cut dimensions of the first element or the second element are selected based on a resulting amount of surface area for welding the first element to the second element.

11. A system comprising:
at least one processor; and
a storage device having instructions stored thereon that, upon execution by the at least one processor, causes performance of operations comprising:

obtaining a virtual model of an object that is to be assembled by securing a first element and a second element to each other, the virtual model specifying pre-cut physical characteristics of the first element and the second element, the pre-cut physical characteristics including:
first pre-cut dimensions of the first element and one or more first physical properties of a material of the first element; and
second pre-cut dimensions of the second element and one or more second physical properties of a material of the second element;
determining, using the virtual model and for each of the first element and the second element, cut dimensions that indicate a manner in which the element is to be altered such that the altered first element and the altered second element include interlockable features that are capable of interlocking with each other, including:
selecting, from a set of element cutting options, one or more element cutting options that correspond to the pre-cut physical characteristics of the first element and the second element, wherein each cutting option correlates cut dimensions with pre-cut physical characteristics of a set of pre-cut elements;
determining, using the virtual model and the one or more element cutting options, multiple candidate cut dimensions of the first element or the second element; and
selecting, from the multiple candidate cut dimensions, particular cut dimensions of the first element or the second element based on (i) a physical characteristic of the element after being altered using each of the multiple candidate cut dimensions and (ii) one or more criteria for the physical characteristic of the element;
generating data that indicates the particular cut dimensions of the first element or the second element; and
providing the data that indicates the particular cut dimensions to one or more computers that are associated with fabricating or assembling the object.

12. The system of claim 11, wherein the interlockable features include a first slot on the first element, a first protrusion on the first element, a second slot on the second element, and a second protrusion on the second element, wherein a portion of the second protrusion is engageable with the first slot, and wherein a portion of the first protrusion is engageable with the second slot.

13. The system of claim 11, wherein obtaining the virtual model comprises at least one of (i) retrieving data indicative of the virtual model from a storage device or (ii) receiving data indicative of the virtual model via a network.

14. The system of claim 11, wherein the virtual model is of an object that is to be assembled by securing the first element and the second element to each other using an articulated robotic arm.

15. The system of claim 11, wherein:
the object is to be assembled by securing the first element and the second element to each other at a joint angle, and
the cut dimensions are determined based at least on the joint angle.

16. A non-transitory computer-readable medium having instructions stored thereon that, upon execution by at least one processor, causes performance of operations comprising:

obtaining a virtual model of an object that is to be assembled by securing a first element and a second element to each other, the virtual model specifying pre-cut physical characteristics of the first element and the second element, the pre-cut physical characteristics including:
  first pre-cut dimensions of the first element and one or more first physical properties of a material of the first element; and
  second pre-cut dimensions of the second element and one or more second physical properties of a material of the second element;
determining, using the virtual model and for each of the first element and the second element, cut dimensions that indicate a manner in which the element is to be altered such that the altered first element and the altered second element include interlockable features that are capable of interlocking with each other, including:
  selecting, from a set of element cutting options, one or more element cutting options that correspond to the pre-cut physical characteristics of the first element and the second element, wherein each cutting option correlates cut dimensions with pre-cut physical characteristics of a set of pre-cut elements;
  determining, using the virtual model and the one or more element cutting options, multiple candidate cut dimensions of the first element or the second element; and
  selecting, from the multiple candidate cut dimensions, particular cut dimensions of the first element or the second element based on (i) a physical characteristic of the element after being altered using each of the multiple candidate cut dimensions and (ii) one or more criteria for the physical characteristic of the element;
generating data that indicates the particular cut dimensions of the first element or the second element; and
providing the data that indicates the particular cut dimensions to one or more computers that are associated with fabricating or assembling the object.

17. The medium of claim 16, wherein the interlockable features include a first slot on the first element, a first protrusion on the first element, a second slot on the second element, and a second protrusion on the second element, wherein a portion of the second protrusion is engageable with the first slot, and wherein a portion of the first protrusion is engageable with the second slot.

18. The medium of claim 16, wherein the virtual model is of an object that is to be assembled by securing the first element and the second element to each other using an articulated robotic arm.

19. The medium of claim 16, wherein:
  the object is to be assembled by securing the first element and the second element to each other at a joint angle, and
  the cut dimensions are determined based at least on the joint angle.

20. The method of claim 9, wherein the particular relationship comprises a computational process that maximizes or minimizes the physical characteristic of the element based on a particular way in which the first element and the second element are to be secured to each other.

* * * * *